United States Patent [19]

Komori et al.

[11] 4,131,565
[45] Dec. 26, 1978

[54] PROCESS FOR REACTIVATING SPENT ACTIVATED-CARBON

[76] Inventors: Masakazu Komori, 1591-47 Hiratocho, Totsuka-ku, Yokohama-shi, Kanagawa; Kazuyuki Shiga, 6-12-23, Minamishinagawa, Shinagawa-ku, Tokyo; Hajime Kitazato, 205, Sasanodai, Asahi-ku, Yokohama-shi, Kanagawa; Hiroaki Okajima, 3-20-4, Jujonakahara, Kita-ku, Tokyo; Yoshiharu Tanaka, 225-7 Oogami, Ayase-cho, Kouza-gun, Kanagawa; Shoiti Nojima, 1-15-16, Sakurajosui, Setagaya-ku, Tokyo; Masashige Fukamachi, 1024-413, Shimonagaya, Konan-ku, Yokohama-shi, Kanagawa; Akinori Kurima, 2-181 Iwamacho, Hodogaya-ku, Yokohama-shi, Kanagawa, all of Japan

[21] Appl. No.: 565,782

[22] Filed: Apr. 7, 1975

Related U.S. Application Data

[63] Continuation-in-part of Ser. No. 326,170, Jan. 24, 1973, abandoned.

[30] Foreign Application Priority Data

Jan. 24, 1972 [JP] Japan .................................. 47-8917
Jun. 28, 1972 [JP] Japan ................................ 47-64678
Jan. 24, 1972 [JP] Japan .................................. 47-8918
Sep. 6, 1972 [JP] Japan ................................ 47-88738

[51] Int. Cl.$^2$ ............................................. B01D 15/06
[52] U.S. Cl. ................................. 252/417; 252/420
[58] Field of Search ............... 252/416, 417, 418, 419, 252/420

[56] References Cited

U.S. PATENT DOCUMENTS 2,933,454  4/1960  Repik et al. .......................... 252/420
3,816,338  6/1974  Corson ................................ 252/420

Primary Examiner—Charles N. Hart
Assistant Examiner—Ivars Cintins
Attorney, Agent, or Firm—Armstrong, Nikaido, Marmelstein & Kubovcik

[57] ABSTRACT

Spent activated-carbon is fluidized and directly heated at a temperature of 100° to 700° C in the first zone with an off gas from the second zone to remove volatiles from the spent carbon. The carbon so treated is then indirectly heated in the second zone at a temperature of 500° to 1000° C in the substantial absence of oxygen with a combustion gas while being fluidized with steam or a steam-containing inert gas to activate the carbon. The process ensures effective utilization of heat energy and substantially reduces the loss of carbon.

6 Claims, 4 Drawing Figures

PROCESS FOR REACTIVATING SPENT ACTIVATED-CARBON

This application is a continuation-in-part application of our application Ser. No. 326,170, filed on Jan. 24, 1973, now abandoned.

The present invention relates to a process for the reactivation of spent activated-carbon. More particularly, it relates to a process for the reactivation of spent activated-carbon using a combustion gas for heating and steam for activation wherein spent activated-carbon is treated in a first zone so as to dry away moisture and to desorb the adsorbates, and the so treated carbon is reactivated in a second zone. The process can be operated continuously and is advantageous in that the heat of the combustion gas used can be effectively utilized and that the loss of carbon during reactivation may be reduced to a great extent.

Activated-carbon is widely used in the treatments of various aqueous solutions, fats, oils, petroleum, dyestuff intermediates, food and other chemicals for the purpose of decoloration, removal of malodour or purification as well as in the tap water treatment and drainage treatment. Among others, activated-carbon is used in extremely large amounts for treating water. Accordingly, reactivation of spent activated-carbon with improved yields is an industrially significant problem.

It has heretofore been known to reactivate spent activated-carbon using a rotary kiln, multi hearth furnace or fluidized bed furnace. Most of the prior art processes are based on direct heating of spent carbon with a combustion gas. However, it is very difficult to provide a completely homogeneous mixture of fuel and air. Even with an optimum fule-to-air ratio, when a mixture of fuel and air is burnt, an appreciable amount of oxygen remains unreacted. Furthermore, at high temperatures the presence of some oxygen in a combustion gas cannot be avoided due to the dissociation equilibrium. In general it is very difficult to maintain the free oxygen content of a combustion gas below 2%. When spent activated-carbon is contacted with such a combustion gas at high temperatures, the oxygen in the gas burns the carbon. Furthermore, reactivation of carbon with oxygen results in brittle products having macro pores, leading to an increase in loss of carbon. The loss of carbon in the prior art direct heating processes is about 5 to 10% by weight (on the basis of the weight of the initial fresh carbon).

U.S. Pat. No. 2,933,454 to A. J. Repik et al, issued on Apr. 19, 1960, discloses a process for the reactivation of spent carbon wherein the spent carbon is fluidized in a first devolatilization zone with a hot gas substantially devoid of oxygen to remove volatiles from the carbon, and then carbon so treated is transferred to a second reactivation zone, where the carbon is fluidized in the presence of an oxygen-containing gas to burn off nonvolatile deposits from the active surface of the carbon. According to the process of the U.S. patent, oxygen must be present in the high temperature reactivation zone. Furthermore, in preferred embodiments described in the patent the reactivated carbon is quenched with air. Thus, in the process of the U.S. patent the carbon is caused to contact oxygen at high temperatures. Such a feature invites an increase in loss of carbon.

Accordingly, a primary object of the invention is to provide a process for the reactivation of spent activated-carbon by means of which the heat of the heating gas may be effectively utilized and the loss of carbon may be minimized.

In accordance with the invention there is provided a process for the reactivation of spent activated-carbon, which comprises the steps of introducing spent activated cabon into a first devolatilization zone, fluidizing and directly heating said spent carbon in said first zone at a temperature between 100° and 700° C. with a gas from a second activation zone to remove volatiles from said spent carbon, transferring the carbon so treated to the second activation zone, indirectly heating said carbon in said second zone at a temperature between 500° to 1000° C. with a hot combustion gas while fluidizing said carbon in the substantial absence of oxygen with steam or a steam-containing inert gas to reactivate said carbon, the off gas from said indirect heating in said second zone being combined with the off gas from said reactivation in said second zone and used for fluidizing and heating said spent carbon in said first zone, and recovering the reactivated carbon from said second zone. The process of the invention can ensure the loss of carbon of 2% by weight or less based on the weight of the initial fresh carbon. Further, the carbon reactivated by the process of the invention possesses substantially the same adsorbing properties as those of the initial fresh carbon.

By the term "fluidizing" referred herein we means the act of passing a stream of a heating gas or an activating gas through a layer of particulate carbon at a velocity which causes the carbon particles to be fluidized in the layer. The layer of fluidized carbon so formed is referred to herein as a fluidized bed. When compared with a so-called fixed or expanded bed, a fluidized bed is characterized by the fact that it ensures sufficient contact between the gas and particles; and that the loss of pressure of the gas stream during passing through the fluidized bed is substantially constant so that the process may be smoothly worked. With such a fluidized bed the velocity of the gas stream may be selected within a wide range from a velocity which is slightly higher than is required to form an expanded bed up to the terminal velocity which permits the gas stream to carry the particles outside the bed.

Reference is now made to the accompanying drawings, in which.

Figure 1:
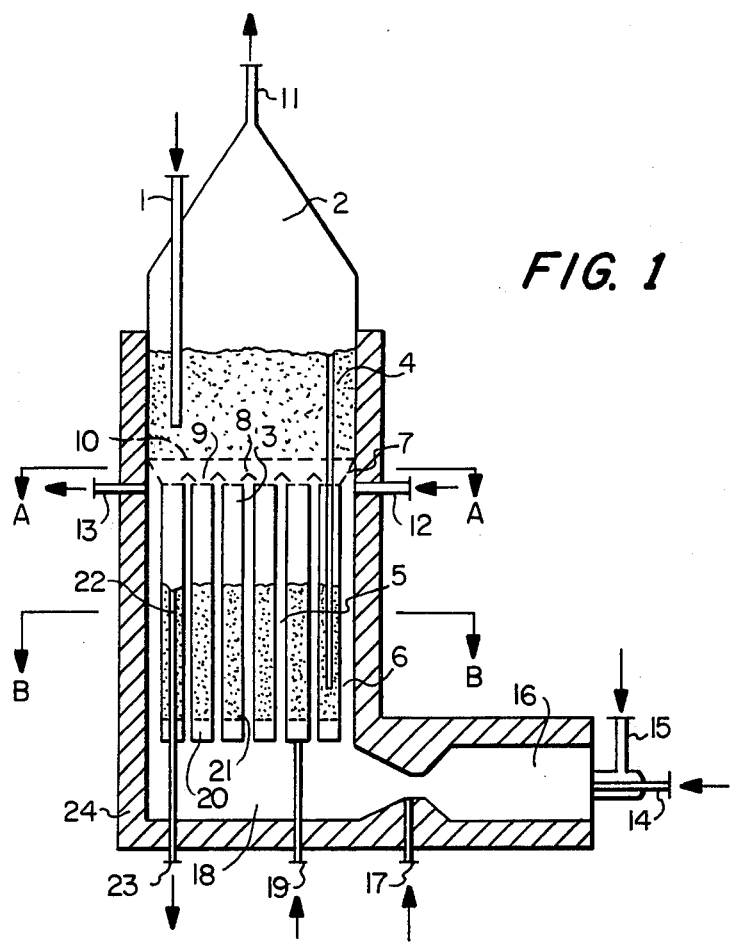
FIG. 1 is a vertical cross-section of one form of apparatus which may be used to carry out the process of the invention.
Figure 2:
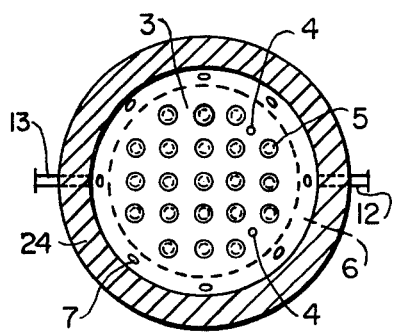
FIG. 2 is a cross-sectional view of the apparatus shown in FIG. 1, taken along the line A—A.
Figure 3:
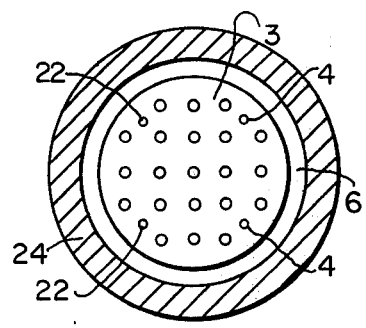
FIG. 3 is a cross-sectional view of the apparatus shown in FIG. 1, taken along the line B—B.

Referring to the FIGS. 1 to 3, the spent activated-carbon, which has adsorbed adsorbates, is continuously supplied through a supply port (1) to a first chamber (2), i.e., a desorbing chamber, in the proximity of a multi-perforated plate (10) which defines the bottom of the first chamber. The supplied carbon is then fluidized by a mixure of a heating off gas and an activation off gas from a second chamber (3), i.e., an activating chamber, and is upwardly passed through the first chamber while being heated at a temperature of 100° to 700° C., and preferably from 100° to 500° C., for a predetermined retention time to dry away moisture or solvent as well as to desorb the adsorbates. The carbon is then passed through one or more down comers (4) downwardly to the second chamber (3). The retention time in the first chamber varies depending upon the nature and amount of the adsorbates, and may generally be selected within a range between 5 and 180 minutes.

The heating and fluidizing gas in the first chamber is a mixture of a combustion gas, which is admitted from heating pipes (5) directly and from an annular passage 6 along the inside wall of the second chamber through distributing nozzles (7), into a distributing chamber (8), with an activation off gas which enters the distributing chamber (8) through a multi-perforated plate (9). The gas enters through a multi-perforated plate (10) the first chamber, where it is used for fluidizing and heating the carbon, and is then led, together with the desorbed adsorbates and moisture, through an exhaust port (11) to a combustion chamber or an incinerating stack.

The temperature and heat duty of the fluidizing gas may be adjusted as required, by supplying a hot combustion gas, steam or nitrogen through a nozzle (12). Also, depending on the fluidizing conditions in the first chamber, a part of the gas may be discharged through a nozzle (13) to adjust the amount to a suitable level. The particular temperature and amount of the fluidizing gas, to be selected, depend on several factors including the selected desorption temperature, the desired fluidized state of the carbon and the thermal stability and volatility of the adsorbates. For example, in a case where substances likely to undergo coking are involved the drying and desorption are carried out at a relatively low temperature for a relatively short period of time using a relatively large amount of gas. The retention time of the carbon in the first chamber may be adjusted by changing the rate of feed of the carbon through the supply pipe (1), the height of the fluidized layer, which is determined by the height of the downcomers (4) above the multi-perforated plate (10), and the rate of flow of the fluidizing gas. In the illustrated apparatus the supply pipe (1) is located vertically along the side wall of the first chamber at one side while a single downcomer (4) is located vertically along the side wall of the first chamber at the opposite side. Although such an arrangement is generally satisfactory, two or more downcomers may also be used especially for the purpose of eliminating any dead space. The lower end of any downcomer should be below a level which is equal to one half of the height of the fluidized layer in the second chamber.

In the second chamber (3), the carbon which has been dried and desorbed, is fluidized by steam, superheated steam or a steam-containing inert gas. Such as fluidizing gas, which is substantially free from oxygen, is fed through a nozzle (19) into a steam distributing chamber (20), where it is uniformly distributed, and then introduced through a multi-perforated plate (21) into the second chamber (3). While being fluidized the carbon is indirectly heated with a combustion gas. Fuel gas or fuel oil is fed through a nozzle (14), and air or an oxygen-containing gas through a nozzle (15) into a combustion chamber (16), where they are burnt to produce a combustion gas at a temperature of 1500° and 2300° C. By supplying steam or a diluent gas through a nozzle (17), the temperature of the combustion gas may be controlled to between 1000° and 1500° C., as needed. The combustion gas enters a combustion gas distributing chamber (18), and thence is uniformly distributed into the heating pipes (5) and the annular passage (6) to indirectly heat the carbon which is maintained in a fluidized state.

The activating steam fed through the nozzle (19) is desirably controlled to the minimum necessary quantity for the activating reaction (water gas reaction). In the second chamber, the carbon, while being mainfained in a fluidized state with steam or a steam-containing inert gas, is indirectly heated with a combustion gas at a temperature of 500° to 1000° C., and preferably from 600° to 1000° C., for a time sufficient to be reactivated. The retention time of the carbon in the second chamber may be usually within the range between 1 and 180 minutes. The retention time of the carbon in the second chamber may be adjusted in a manner as described hereinabove with respect to the first chamber, although the rate of supply of the carbon is automatically fixed depending on the working conditions in the first chamber. The activation temperature and retention time in the second chamber should suitably be selected depending upon the nature of the adsorbates, as well as the degrees of desorption and coking. The reactivated carbon is passed through a downcomer (22) and a nozzle (23) to a quenching vessel. When the reactivated carbon is intended to be re-used in a water treatment, it is desirable to quench the reactivated carbon with cold or warm water. Whereas, in a case where a dry product is to be obtained, the carbon may be quenched with steam or an inert gas such as nitrogen, or by indirect cooling.

The capacities of the first and second chambers may be determined depending upon the quantity of spent carbon to be treated and the required retention times in the respective chambers, which times in turn depend upon the nature and quantity of the adsorbates. The effective cross-sectional area of each chamber may be determined by the optimum flow speed of the fluidizing gas for maintaining the carbon in a fluidized state. The effective cross-sectional area of the first chamber is, in general, broader than that of the second chamber, owing to the fact that the carbon is directly heated in the first chamber with the fluidizing gas. With respect to the second chamber where the carbon is indirectly heated, it is desirable to improve the heat transmission efficiency by providing a number of heating pipes as needed in the fluidized bed and to increase the flow rate of the heating gas passing through these pipes. The first chamber may also be operated with improved heat transmission and energy efficiencies owing to the adoption of direct heating of the fluidized carbon. These help make the units smaller than the conventional reactivating furnaces. The heating pipes (5) may generally have a diameter ranging between $\frac{1}{4}''$ to $1''$. The number of the heating pipes to be provided and the diameter of each pipe may be selected depending upon the quantity of gas to be passed therethrough and the heat transfer area required. In some cases where a sufficient heat transfer area may be provided by the annular passage (6) along the inside wall of the second chamber, the heating pipe (5) may be omitted.

The combustion chamber (16) may be of a small capacity, with a narrowed outlet to achieve high heat intensity combustion (for example, $1 \times 10^5$ to $1 \times 18^8$ Kcal/m$^3$. hr).

With respect to the material of each unit, the heating pipes (5), the annular passage (6) and the inner wall of the second chamber may usuably be made of heat-resisting alloys, such as 25Cr - 21Ni steel, 50Co - 20Cr steel and 75Ni - 15Cr steel. For the inner wall of the first chamber, 18Cr - 8Ni steel, any of the above-mentioned heat-resisting alloys, or carbon steel lined with a refractory may be used. The outer walls of the first and second chambers, as well as the wall of the combustion chamber 16 may be composed of such refractories as high-alumina or zirconia bricks or castable refractory materials surrounded by a castable insulating materials. In order to minimize heat loss, the entire apparatus may be surrounded by a layer of a suitable insulating material.

While the heat quantities required for the respective treatments in the first and second chambers vary depending upon the nature of the carbon and the nature of the adsorbates, we have found that the ratio of the heat energy required in the first chamber to that in the second chamber normally lies within the range of 1.5:1 to 4:1.

As already described, in the process of the invention spent activated-carbon is fluidized in the first chamber with a hot off gas from the second chamber. The carbon is directly heated by the gas while being maintained in a fluidized state at a temperature of 100° to 700° C. Apparently, such a direct heating in a fluidized state ensures the effective utilization of heat energy. Because of a relatively low temperature and the fact that the fluidizing and heating gas contains the water gas reaction product ($H_2$ and $CO$) formed by the reactivation in the second chamber, which product provides a reducing atmosphere in the first chamber, undesirable burning of the carbon and coking due to oxidation of adsorbates may advantageously be minimized. In the second chamber, the carbon fluidized with steam or a steam-containing inert gas is reactivated in the substantial absence of oxygen through water gas reaction by being indirectly heated at a temperature of 500° to 1000° C. Therefore, the loss of carbon during reactivation is very little.

In the conventional adsorbing processes using activated-carbon, the cost for reactivating spent carbon represents a large proportion of total treatment cost. For example, in the case of a waste water treatment with activated-carbon, from 30 to 50 percent of the total cost is used for making up for the lost carbon. When the process of this invention is incorporated in the water treatment, the whole treatment can be effected at a cost ranging between 50 and 70 percent of conventional treatment cost, as a result of reduction in reactivation loss and effective utilization of heat.

Figure 4:
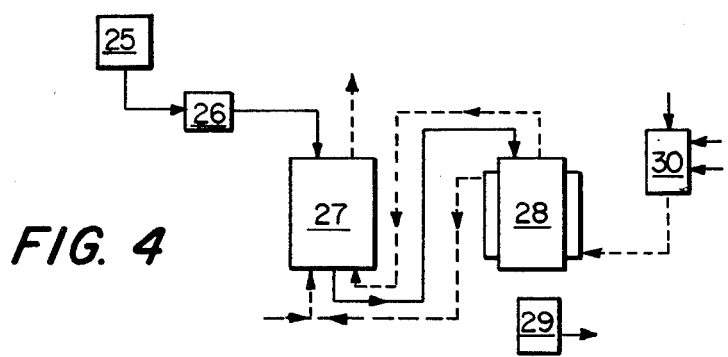
FIG. 4 is a flow sheet illustrating one embodiment of the process of the invention.

It should be appreciated that various modifications and changes would be obvious to those skilled in the art without departing from the spirit of the vention. For example, the off gas from the first step may be utilized for preheating the spent carbon to be treated. Alternatively, the devolatilization may be carried out in two or more stages. In the illustrated embodiment, the first and second chambers are vertically connected, the latter on top of the former, producing an effect of reducing the area of plant site required. However, such an arrangement is not always necessary. FIG. 4 is a flow sheet, illustrating one embodiment of the invention, comprising a spent carbon receiver (25), a carbon feeder (26), a first chamber (27, a second chamber (28), a quenching vessel (29) and a combustion chamber (30).

Now the present invention is further illustrated by the following specific examples.

EXAMPLE 1

Using an apparatus as illustrated in FIGS. 1 through 3, spent activated-carbon was continuously treated, which has been used for treating a waste water from a petroleum refinery and has adsorbed thereon 400mg of COD/g. The conditions used were as follows.

Rate of feed of the spent carbon: 56Kg/hr
Temperature in the first chamber: 300° C.
Retention time in the first chamber: 30 min.
Temperature in the second chamber: 800° C.
Retention time in the second chamber: 15 min.
Rate of feed of steam for activation: about 3Kg/hr The reactivated carbon was recovered in an amount of 39.4Kg/hr, revealing that the loss of carbon was 1.5% be weight (on the basis of the weight of the initial fresh carbon).

In the process, a combustion gas obtained by burning propane with air was used. The required utilities were as follows.

Fuel: about 100,000Kcal/hr
Steam: 90Kg/hr
Power: 9Kw/hr

The reactivated carbon obtained exhibited substantially the same adsorbing properties as the initial fresh carbon.

EXAMPLE 2

A waste water from a petrochemical plant having COD of 60ppm was treated by being passed through a 10-stage activated-carbon fluidized bed adsorbing column, at a rate of flow of 20m/hr and for the retention of 20 minutes. The water so treated had COD of 15ppm. The amount of COD adsorbed on the carbon was 0.25g/g of carbon (80% of the equilibrium adsorption).

The spent carbon was reactivated in a manner as described in Example 1 under the following conditions.

Rate of feed of the spent carbon: 20Kg/hr
Temperature in the first chamber: 300° C.
Retention time in the first chamber: 60 min.
Temperature in the second chamber: 830° C.
Retention time in the second chamber: 30 min.

The reactivation loss of carbon was 2% by weight on the basis of the weight of the initial fresh carbon. The reactivated carbon exhibited substantially the same adsorbing properties as the initial fresh carbon.

For comparative purpose another portion of the same spent carbon was reactivated in a multi hearth furnace (6 stages) with the highest activation temperature of 830° C. The reactivation loss of carbon was 6% on the same basis.

What is claimed is:

1. A process for the reactivation of spent activated-carbon, which comprises the steps of introducing spent activated carbon into a first devolatilization zone, fluidizing and directly heating said spent carbon in said first zone at a temperature between 100° and 700° C. with a gas from a second activation zone to remove volatiles from said spent carbon, transferring the carbon so treated to the second activation zone, indirectly heating said carbon in said second zone at a temperature between 500° to 1000° C. with a hot combustion gas while fluidizing said carbon in the substantial absence of oxygen with steam or a steam-containing inert gas to reactivate said carbon, the off gas from said indirect heating in said second zone being combined with the off gas from said reactivation in said second zone and used for fluidizing and heating said spent carbon in said first zone, and recovering the reactivated carbon from said second zone.

2. A process in accordance with claim 1 wherein the devolatilization in the first zone is carried out at a temperature of 100° to 500° C. and the activation in the second zone is carried out at a temperature of 600° to 1000° C.

3. A process in accordance with claim 2 wherein the retention time of the carbon in the first zone is 5 to 180 minutes and the retention time of the carbon in the second zone is 1 to 180 minutes.

4. A process in accordance with claim 1 wherein the retention time of the carbon in the first zone is 5 to 180 minutes and the retention time of the carbon in the second zone is 1 to 180 minutes.

5. A process in accordance with claim 1 wherein the temperature of the gas from the second activation is adjusted with a gas selected from the group consisting of a hot combustion gas, 6. A process in accordance with claim 1 which includes the additional step of quenching the reactivated carbon recovered from said second zone with steam, an inert gas or indirect cooling.

* * * * *